United States Patent

Hanawa et al.

[11] Patent Number: 5,890,077
[45] Date of Patent: Mar. 30, 1999

[54] MOBILE TERMINAL SELECTIVELY OPERABLE WITH A BOOSTER AND MOBILE COMMUNICATION SYSTEM

[75] Inventors: Tetsuya Hanawa; Mitsunori Maeda; Hiroyuki Nagatani; Makoto Ishida; Masahiro Konno, all of Kawasaki, Japan

[73] Assignee: Fujitsu Limited, Kanagawa, Japan

[21] Appl. No.: 496,211

[22] Filed: Jun. 28, 1995

[30] Foreign Application Priority Data

Jun. 30, 1994 [JP] Japan .................................. 6-149111

[51] Int. Cl.$^6$ ...................................................... H04B 1/40
[52] U.S. Cl. .......................... 455/571; 455/127; 455/517; 455/346
[58] Field of Search .................................. 455/69, 70, 89, 455/95, 100, 54.1, 127, 345, 346, 351, 99, 571, 522; 379/58

[56] References Cited

U.S. PATENT DOCUMENTS

| | | | |
|---|---|---|---|
| 5,036,532 | 7/1991 | Metroka et al. | 379/58 |
| 5,146,614 | 9/1992 | Furuno | 455/89 |
| 5,276,918 | 1/1994 | Cornforth et al. | 455/571 |
| 5,524,044 | 6/1996 | Takeda | 379/58 |

FOREIGN PATENT DOCUMENTS

| | | |
|---|---|---|
| 194618 | 8/1989 | Japan . |
| 1-264321 | 10/1989 | Japan . |
| 109829 | 5/1991 | Japan . |
| 3-117119 | 5/1991 | Japan . |
| 3-201731 | 9/1991 | Japan . |
| 5146614 | 9/1992 | Japan . |
| 4-364615 | 12/1992 | Japan . |

*Primary Examiner*—Wellington Chin
*Assistant Examiner*—Lee Nguyen
*Attorney, Agent, or Firm*—Helfgott & Karas, P.C.

[57] ABSTRACT

In a first aspect of the invention, when it is expected to disconnect a booster during a call, the station class mark is changed to that applicable when a portable telephone is used as an independent unit in accordance with a key input from the user before the initiation of the call. In a second aspect of the invention, the telephone number of the remote party is stored in a memory during a call. When a connection or disconnection of a booster is detected, the call is terminated, and a redialing operation is automatically performed using the stored telephone number. In a third aspect of the invention, when the connection of a booster is detected during a call, an instruction is given to the booster to operate in a portable telephone mode. In a fourth aspect of the invention, when the connection or disconnection of a booster is detected during a call, a request to change the station class mark is sent to the base station.

4 Claims, 9 Drawing Sheets

MOBILE TERMINAL SELECTIVELY OPERABLE WITH A BOOSTER AND MOBILE COMMUNICATION SYSTEM

BACKGROUND OF THE INVENTION

1. Field of the Invention

The present invention relates to a mobile terminal, such as a car telephone or a portable telephone, and a mobile communication system.

2. Description of the Related Art

Since portable telephones are designed to operate on relatively low-capacity secondary batteries or primary batteries for reduced size and weight, their maximum transmitter output power is limited to about 1 W. On the other hand, car telephones, which can take power from an onboard secondary battery having a relatively large capacity, have a transmitter output power of about 3 to 5 W. It is known to provide a configuration that enables such a car telephone to be used as a booster for a portable telephone.

In a mobile communication system, each base station measures the field strength of the power radiated from a mobile terminal such as a portable telephone or a car telephone, and controls the transmitter output of the mobile terminal based on the result of the measurement. In a usual configuration, the base station recognizes the station class mark (SCM) of the mobile terminal to learn its maximum allowable level, and when the transmitter output power of the mobile terminal has been increased to the maximum allowable level under the control of the base station, no further increase in the transmitter power is instructed but zone switching is performed. For this purpose, each mobile terminal transmits its station class mark to the base station at the beginning of a call. However, the station class mark transmitted when a call is initiated directly from the portable telephone is different from that transmitted when a call is initiated with a booster connected as described above. Also, there may occur a situation where the portable telephone is connected to or disconnected from the booster during the call.

For example, consider the situation where a voice communication is being performed with a portable telephone connected to a car telephone booster, when the car arrive at the destination and the user gets out of the car. If the user wants to continue the ongoing communication, he will disconnect the portable telephone from the booster. In that case, however, since the base station cannot recognize that the portable telephone has been disconnected from the booster during the call, the base station continues to control the transmitter power on the basis of the station class mark of the booster transmitted at the beginning of the call. If the reception field strength at the base station drops and control is performed instructing the mobile terminal to increase the transmitter power to a level greater than the transmitter power of the portable telephone, the portable telephone fails to conform to the control, and the base station determines that a fault condition has occurred in the portable telephone and disconnects the call.

Therefore, in the prior known system, if the user has to disconnect his portable telephone from a booster during a call, he terminates the call and then performs a call initiating operation once again, whereby the station class mark of the portable telephone is transmitted to the base station which then performs control of the transmitter output of the portable telephone on the basis of the new station class mark. The prior known system thus has the problem that a call has to be terminated before communication can be resumed normally.

Conversely, consider the situation where a voice communication is initiated from the portable telephone and the user gets into a car where he connects the portable telephone to the booster to continue the communication. In this case also, since the station class mark held at the base station is different from the actual station class mark, there arises a problem in that the transmitter power may be raised to a level higher than the base station expects.

SUMMARY OF THE INVENTION

It is a first object of the present invention to provide a configuration that enables,the ongoing call to be continues, uninterrupted if a portable telephone is connected to or disconnected from a booster during the call.

It is a second object of the present invention to prevent unnecessary power consumption when the portable telephone is connected to a booster during a call.

According to the present invention, there is provided a mobile terminal comprising: means for transmitting first data indicating a station class of a booster-disconnected condition to a base station when a voice communication is commenced with a booster disconnected; means for transmitting second data indicating a station class of a booster-connected condition to a base station when a voice communication is commenced with a booster connected; and means for changing the data that the second data transmitting means transmits from the second data to the first data in accordance with a user request.

According to the present invention, there is also provided a mobile terminal comprising: means for transmitting first data indicating a station class of a booster-disconnected condition to a base station when a voice communication is commenced with a booster disconnected; means for transmitting second data indicating a station class of a booster-connected condition to a base station when a voice communication is commenced with a booster connected; means for storing a remote-party telephone number during the communication; and means for automatically performing a redialing operation using the remote-party telephone number stored in the telephone number storing means, after the communication is forcefully terminated following the connection or disconnection of the booster during the communication.

According to the present invention, there is also provided a mobile terminal comprising: means for transmitting first data indicating a station class of a booster-disconnected condition to a base station when a voice communication is commenced with a booster disconnected; means for transmitting second data indicating a station class of a booster-connected condition to a base station when a voice communication is commenced with a booster connected; means for detecting whether a booster is connected or not; and means for, when the booster connection detecting means has detected the presence of a booster during the communication, instructing the booster to operate with the transmitter output applicable to the booster-disconnected condition.

According to the present invention, there is also provided a mobile communication system comprising a mobile station and a base station, said mobile station comprising means for transmitting first data indicating a station class of a booster-disconnected condition to a base station when a voice communication is commenced with a booster disconnected, means for transmitting second data indicating a station class of a booster-connected condition to a base station when a voice communication is commenced with a booster connected, means for detecting whether a booster is connected or not, and means for transmitting the first data or the second data to the base station along with a station class change request when the booster connection detecting means has detected the connection or disconnection of a booster during the communication, and said base station comprising means for changing the station class in response to the station class change request.

DESCRIPTION OF THE PREFERRED EMBODIMENTS

Figure 1:
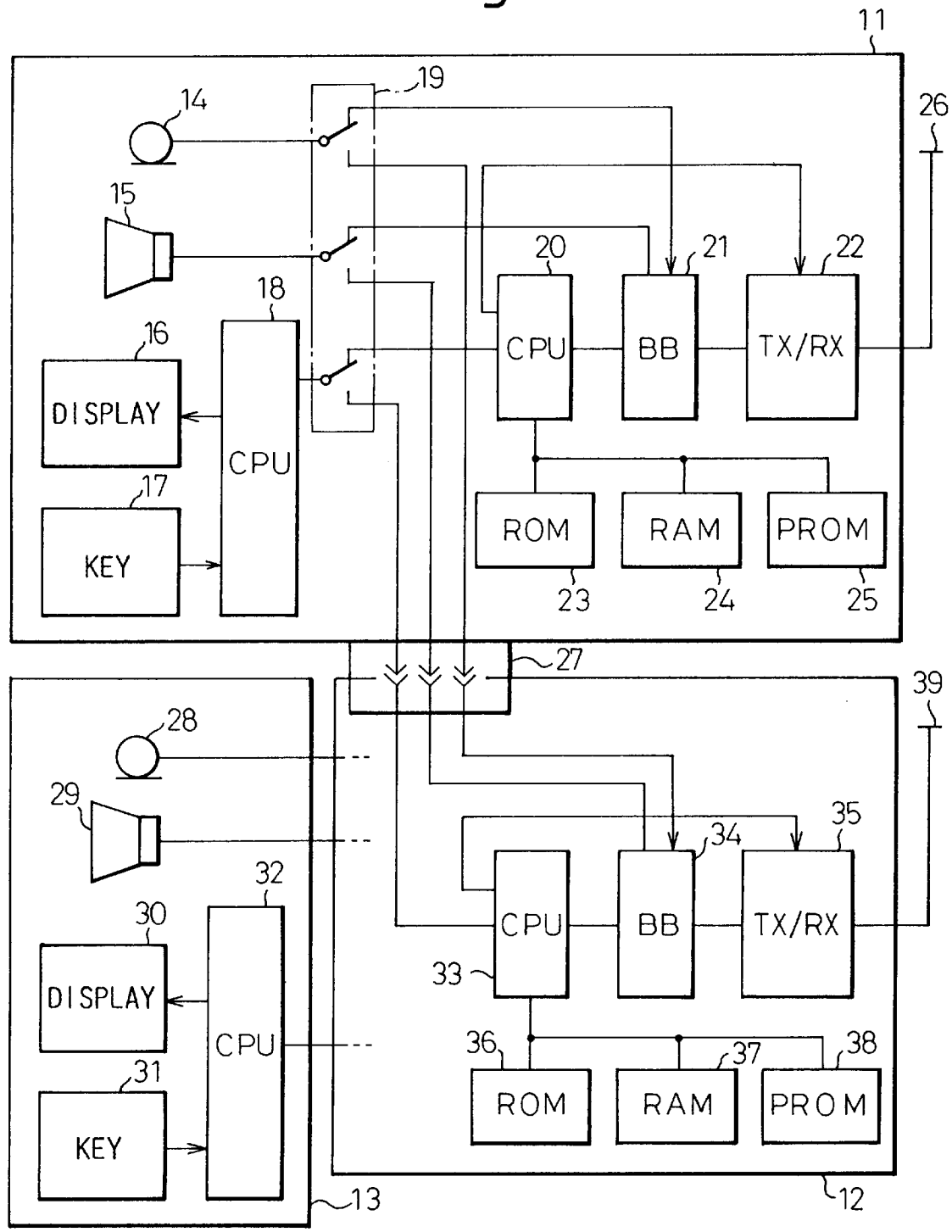
FIG. 1 is a diagram illustrating a first embodiment of the present invention.

FIG. 1 is a diagram illustrating a first embodiment of the present invention, wherein reference numeral 11 is a portable telephone, 12 is a car telephone booster, 13 is a car telephone handset, 14 and 28 are microphones, 15 and 29 are speakers, 16 and 30 are liquid-crystal displays, 17 and 31 are keypads, 18, 20, 32, and 33 are processors (CPUs), 19 are selector switches, 21 and 34 are baseband circuits, 22 and 35 are transmit/receive sections, 23 and 36 are read-only memories (ROMs), 24 and 37 are random-access memories (RAMs), 25 and 38 are erasable programmable read-only memories (PROMs) such as EEPROMS, 26 and 39 are antennas, and 27 is a connector.

The portable telephone 11 can be used independently without the booster 12 or can be connected to the booster 12 for use. When making a voice communication using the handset 13 connected directly to the booster 12, the transmit/receive functions incorporated in the booster 12 are used. The processors 18 and 32 in the portable telephone 11 and the handset 13 are responsible for the processing of input information from the keypads 17 and 31, control of the displays 16 and 30, and the transfer of control information to and from the processors 20 and 33.

The read-only memories 23 and 36 are used to store communication control programs, station class marks, etc. On the other hand, the random-access memories 24 and 37 are used to temporarily store control information necessary for communication control as well as data used for data communication, etc. The programmable read-only memories 25 and 36 are used to store telephone numbers for memory dialing, the terminal telephone numbers, etc.

The processors 20 and 33 perform communication control in accordance with the programs stored in the read-only memories 23 and 36, such as transmission control of telephone numbers, transmission control of station class marks, detection control of incoming calls, and transmitter output power control of the transmit/receive sections 22 and 35. The selector switches 19 are set to the appropriate positions depending on whether the portable telephone 11 is used independently or connected to the booster 12. The illustrated example shows the switch connections when the portable telephone 11 is used independently. The selector switches 19 may be constructed so that they are automatically set to the appropriate positions depending on whether the connector 27 is inserted or not; that is, when the booster 12 is not connected, the switches are in the illustrated positions, and when the booster 12 is connected via the connector 27, the switches are set to the other positions for connection to the booster 12 via the connector 27.

When using the portable telephone 11 as an independent unit under the control of the processor 20, the station class mark of the portable telephone 11 stored in the read-only memory 23 is read into the random-access memory 24 and transferred via the baseband circuit 21 to the transmit/receive section 22 for transmission to the base station. During voice communication, voice signals from the microphone 14 are directed by the selector switch 19 to the baseband circuit 21 and on to the transmit/receive section 22 for transmission from the antenna 26 to the base station. On the other hand, voice signals received by the antenna 26 are fed into the transmit/receive section 22 for processing, and the processed voice signals are passed through the baseband circuit 21 and applied to the speaker 15 via the selector switch 19. The processor 20 also controls the transmitter output level of the transmit/receive section 22 in accordance with the transmitter output control information from the base station.

When using the portable telephone 11 by connecting it to the booster 12, or when using the handset 13 for a voice communication, under the control of the processor 33, the station class mark of the booster 12 stored in the read-only memory 36 is read into the random-access memory 37 and transferred via the baseband circuit 34 to the transmit/receive section 35 for transmission from the antenna 39 to the base station. The base station transmits transmitter output control information based on the station class mark received at the beginning of the communication and the field strength of received power.

The voice signals from the microphone, 14 are directed via the selector switch 19 and through the connector 27 to the baseband circuit 34 and on to the transmit/receive section 35 for transmission to the base station. On the other hand, received voice signals processed in the transmit/receive section 35 are fed to the baseband circuit 34 from which the signals are transferred via the connector 27 and applied to the speaker 15 via the selector switch 19. The processor 33 also controls the transmitter output level of the transmit/receive section 35 in accordance with the transmitter output control information from the base station.

Now consider a case where, after commencing a voice communication with the portable telephone 11 connected to the booster 12 and the selector switches 19 set for connection to the booster 12, the user disconnects the portable telephone 11 from the booster 12 and continues the communication using the portable telephone 11 as an independent unit by setting the selector switches 19 in the illustrated positions; for example, the user commences a voice communication as a car telephone and expects to continue the communication after getting out of the car at the destination. If such a case is expected, the user enters a station class mark change request from the keypad 17 before initiating the call.

In accordance with the information thus entered, the processor 18 performs processing to transfer the station class mark stored in the read-only memory 23 in the portable telephone 11 to the random-access memory 37 in the booster 12 by transferring information to and from the processor 33 in the booster 12. To achieve this, a transfer path (not shown) via the connector 27 is formed between the processors 20 and 33 for transfer of the station class mark.

When a call initiating operation is performed using the portable telephone 11, the station class mark of the portable telephone 11 stored in the random-access memory 37 in the booster 12 is transmitted to the base station. Therefore, even when a call is initiated with the portable telephone 11 connected to the booster 12, the base station recognizes the call as a one made directly from the portable telephone 11 and controls the transmitter output accordingly. As a result, if the portable telephone 11 is disconnected from the booster 12 during the call, the call can be carried on with the portable telephone 11 without any problem. No special provision is needed in the base station to implement this arrangement. When the call is terminated, the station class mark of the portable telephone 11 stored in the random-access memory 37 in the booster 12 is erased under the control of the processor 33, thus getting ready for the next call.

Figure 2:
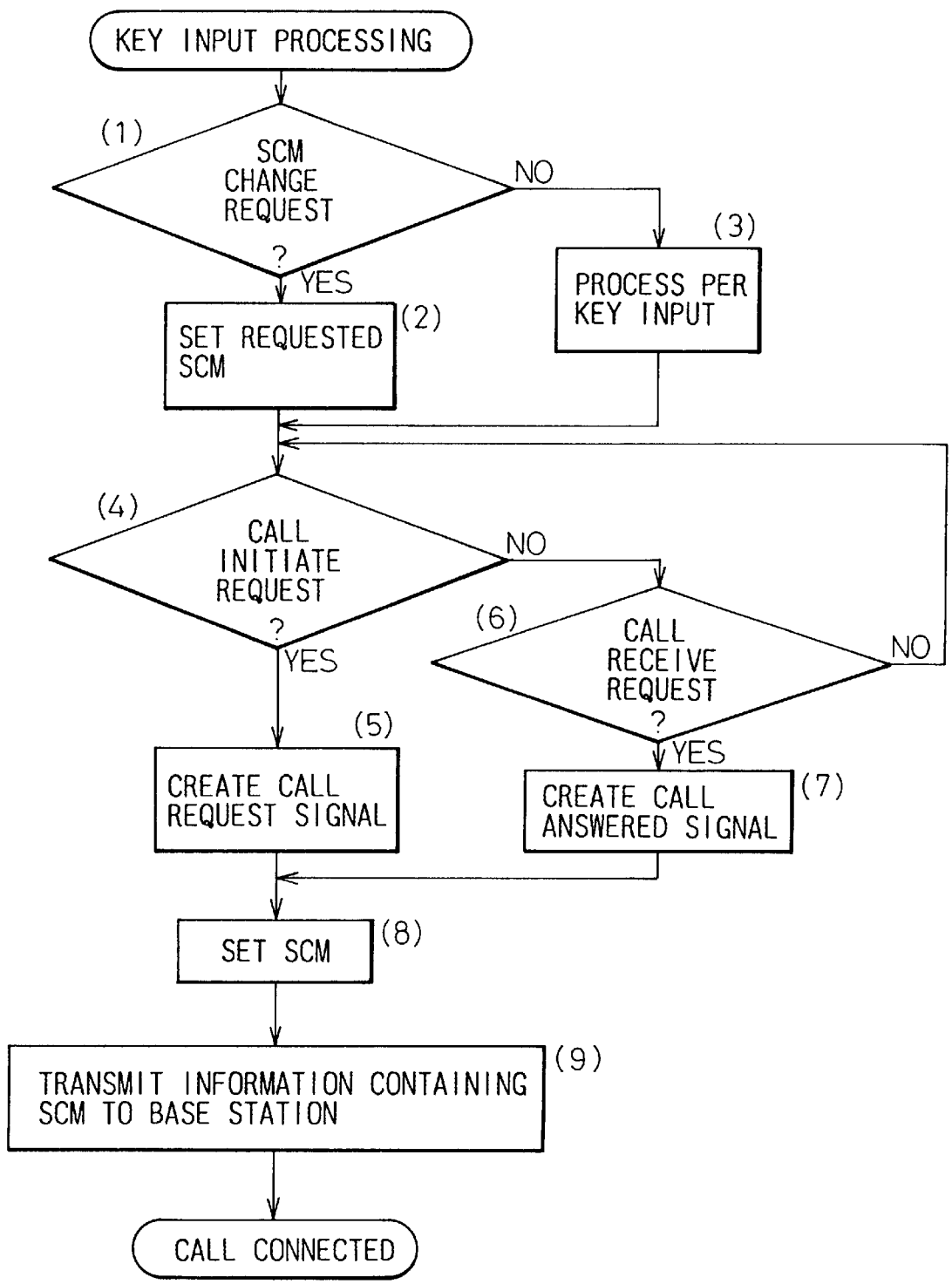
FIG. 2 is a flowchart illustrating the operation of the first embodiment of the present invention.

FIG. 2 shows a flowchart illustrating the operation of the first embodiment of the present invention. A key input from the keypad 17 on the portable telephone 11 or the keypad 31 on the handset 13 is processed by the processor 18 or 32 which determines if the key input is a station class mark SCM change request (1). If it is not a station class mark change request, processing that matches the contents of the key input is performed (3). If it is a station class mark SCM change request, for example, if it is a request to change to the station class mark of the portable telephone 11, the requested station class mark is transferred to the booster 12 for loading into the random-access memory 37 (RAM) (2).

Then, the processor 33 in the booster 12 determines if there is a call initiate request (4); if there is no call initiate request, then it is determined whether there is a call receive request (6). When a call initiating operation is performed using the portable telephone 11 or the handset 13, a call request signal is created (5), and the station class mark stored in the random-access memory 37 in step (2) is set in call request information, etc. for transmission to the base station (8). Then, the information containing the station call mark is transferred to the transmit/receive section 35 for transmission from the antenna 39 (9). In the case of an incoming call, a call answered signal is created (7), and the station class mark stored in the random-access memory 37 is transmitted from the transmit/receive section 35 to the base station via the antenna 39.

Figure 3:
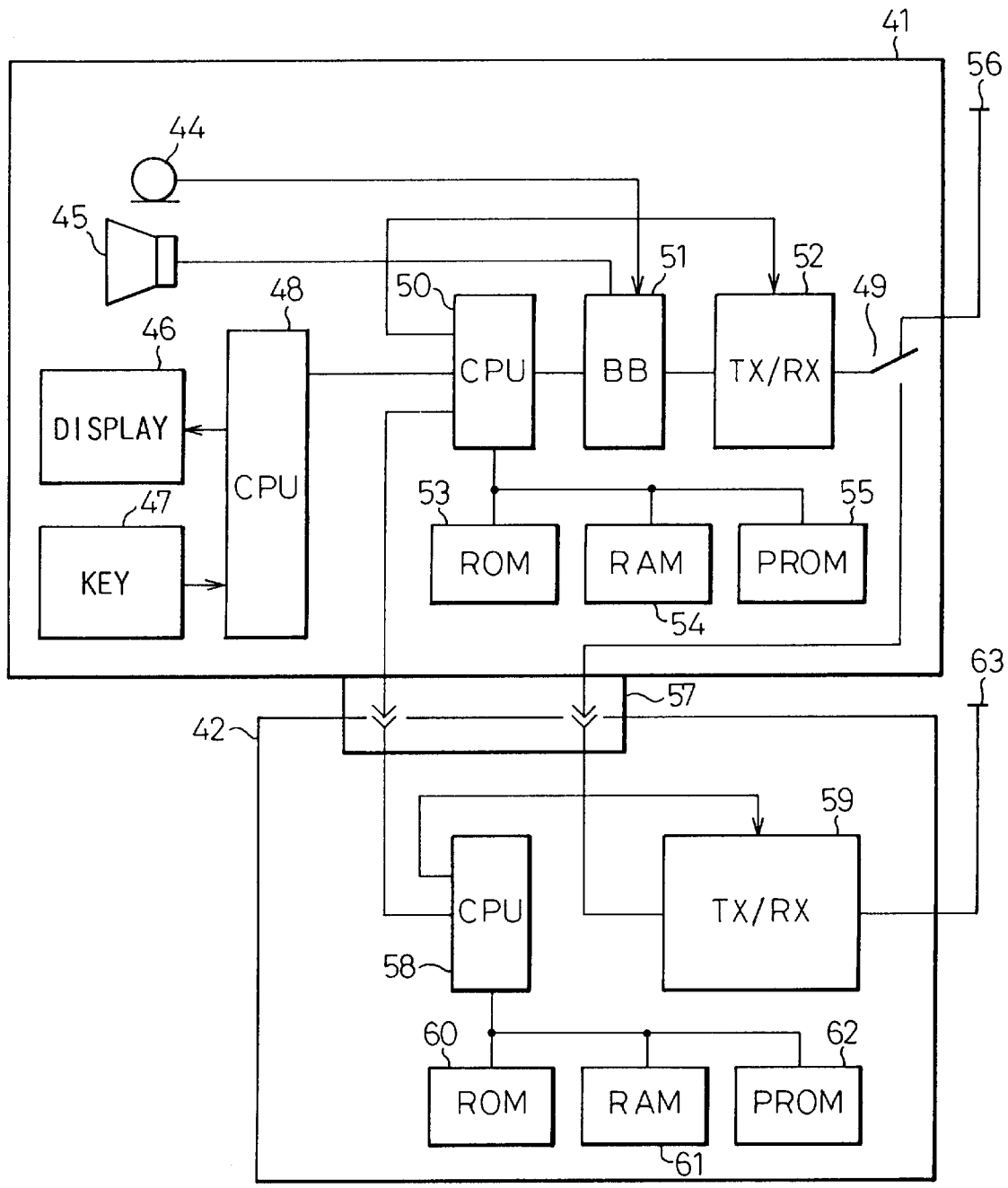
FIG. 3 is a diagram illustrating a second embodiment of the present invention.

FIG. 3 is a diagram illustrating a second embodiment of the present invention, wherein reference numeral 41 is a portable telephone, 42 is a booster, 44 is a microphone, 45 is a speaker, 46 is a display, 47 is a keypad, 48, 50, and 58 are processors (CPU), 49 is a selector switch, 51 is a baseband circuit, 52 and 59 are transmit/receive sections, 53 and 60 are read-only memories (ROMs), 54 and 61 are random-access memories (RAMs), 55 and 62 are programmable read-only memories (PROMs) such as EEPROMs, 56 and 63 are antennas, and 57 is a connector.

In this embodiment, the selector switch 49 is operated to determine whether the portable telephone 41 will be used as an independent unit or connected to the booster 42 to make a communication. The selector switch 49 may be constructed so that it is automatically set for connection to the booster 42 when the portable telephone 41 is connected to the booster 42 via the connector 57. The transmit/receive section 59 in the booster 42 consists essentially of radio frequency transmit/receive signal amplifiers, and the transmitter output power is controlled by the processor 58 in accordance with the transmitter output control information from the base station.

When commencing voice communication with the portable telephone 41 connected to the booster 42, the station class mark of the booster 42 is read from the read-only memory 60 and loaded into the random-access memory 61 and transmitted to the base station under the control of the processors 50 and 58. When the booster 42 is used at the beginning of the call and disconnection of the portable telephone 41 from the booster 42 is expected during the call, a station class mark change request is entered from the keypad 47 before initiating the call, as in the foregoing embodiment. The processor 48 then recognizes and processes the input from the keypad 47, and transfers information containing the station class mark change request to the processor 50. The processor 50 then reads out the station class mark of the portable telephone 41 stored in the read-only memory 53, and transfers it via the processor 58 to the random-access memory 61. The station class mark of the portable telephone 41 is thus set instead of the station class mark of the booster 42.

With the selector switch 49 set for connection to the booster 42, when a call initiating operation is performed, the station class mark of the portable telephone 41 stored in the random-access memory 61 is transferred to the transmit/receive section 59, under the control of the processors 50 and 58, for transmission to the base station from the antenna 63. Therefore, if the portable telephone 41 is disconnected from the booster 42 during the call, since the base station continues to control the transmitter output in accordance with the station class mark of the portable telephone 41, the ongoing communication can be continued without interruption.

Figure 4:
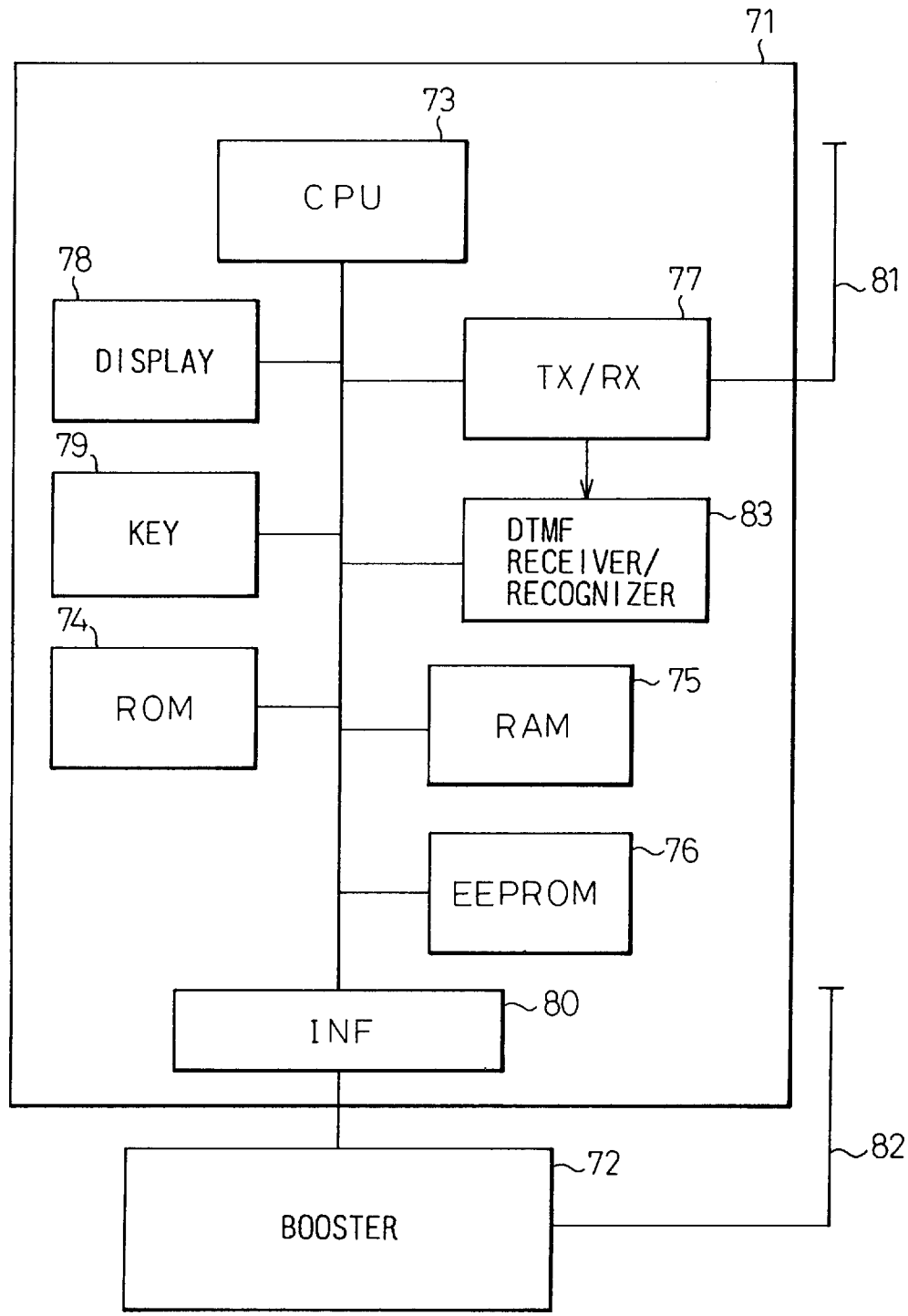
FIG. 4 is a diagram illustrating a third embodiment of the present invention.

FIG. 4 is a diagram illustrating a third embodiment of the present invention, showing essential parts for an automatic redialing operation. In the figure, reference numeral 71 is a portable telephone, 72 is a booster, 73 is a processor (CPU), 74 is a read-only memory (ROM), 75 is a random-access maemory (RAM), 76 is an electrically erasable programmable read-only memory (EEPROM), 77 is a transmit-receive section, 78 is a display, 79 is a keypad, 80 is an interface (INF) including a connector, 81 and 82 are antennas, and 83 is a DTMF receiver/recognizer for receiving and recognizing DTMF (dual tone multi-frequency) signals transmitted from a remote party.

When commencing a voice communication using the portable telephone 71 as an independent unit, the station class mark of the portable-telephone 71 stored in the read-only memory 74 is read into the random-access memory 75 and transmitted from the transmit/receive section 77 via the antenna 81 to the base station at the beginning of the communication. On the other hand, when the booster 72 is connected, the station class mark of the booster 72 is transmitted from the antenna 82 to the base station.

During communication with the remote party by using the portable telephone 71 as an independent unit, if it is desired to connect the portable telephone 71 to the booster 72, the user asks the remote party to operate his keypad or the like to transmit his telephone number by DTMF signals. The DTMF signals are received and recognized by the DTMF receiver/recognizer 83, and the telephone number of the remote party is stored in the random-access memory 75 under the control of the processor 73.

Then, the portable telephone 71 is connected to the booster 72, whereupon the processor 73 terminates the call, and then reads out the remote party's telephone. number stored in the random-access memory 75 to perform an automatic redialing-operation. With this operation, the station class mark of the booster 72 is transmitted to the base station, after which the transmitter output is controlled in accordance with the station class mark of the booster 72.

Also, after commencing a voice communication with the portable telephone 71 connected to the booster 72, if it is desired to disconnect the portable telephone 71 from the booster 72 during the communication, the user asks the remote party to transmit his telephone number by DTMF signals. The transmitted signals are received and recognized by the DTMF receiver/recognizer 83, and the remote party's telephone number is stored in the random-access memory 75.

Then, the portable telephone 71 is disconnected from the booster 72, whereupon the processor 73 terminates the call, and then reads out the remote party's telephone number stored in the random-access memory 75 to perform an automatic redialing operation. With this operation, the station class mark of the portable telephone 71 is transmitted to the base station, after which the transmitter output is controlled in accordance with the station call mark of the portable telephone 71.

Furthermore, when a call is initiated with the portable telephone 71 either as an independent unit or connected to the booster 72, the called telephone number can be stored in the random-access memory 75 for use as the remote-party telephone number for the above-described redialing operation. Such a configuration can be readily implemented using the same configuration as that employed for a redial function incorporated in an ordinary telephone.

Figure 5:
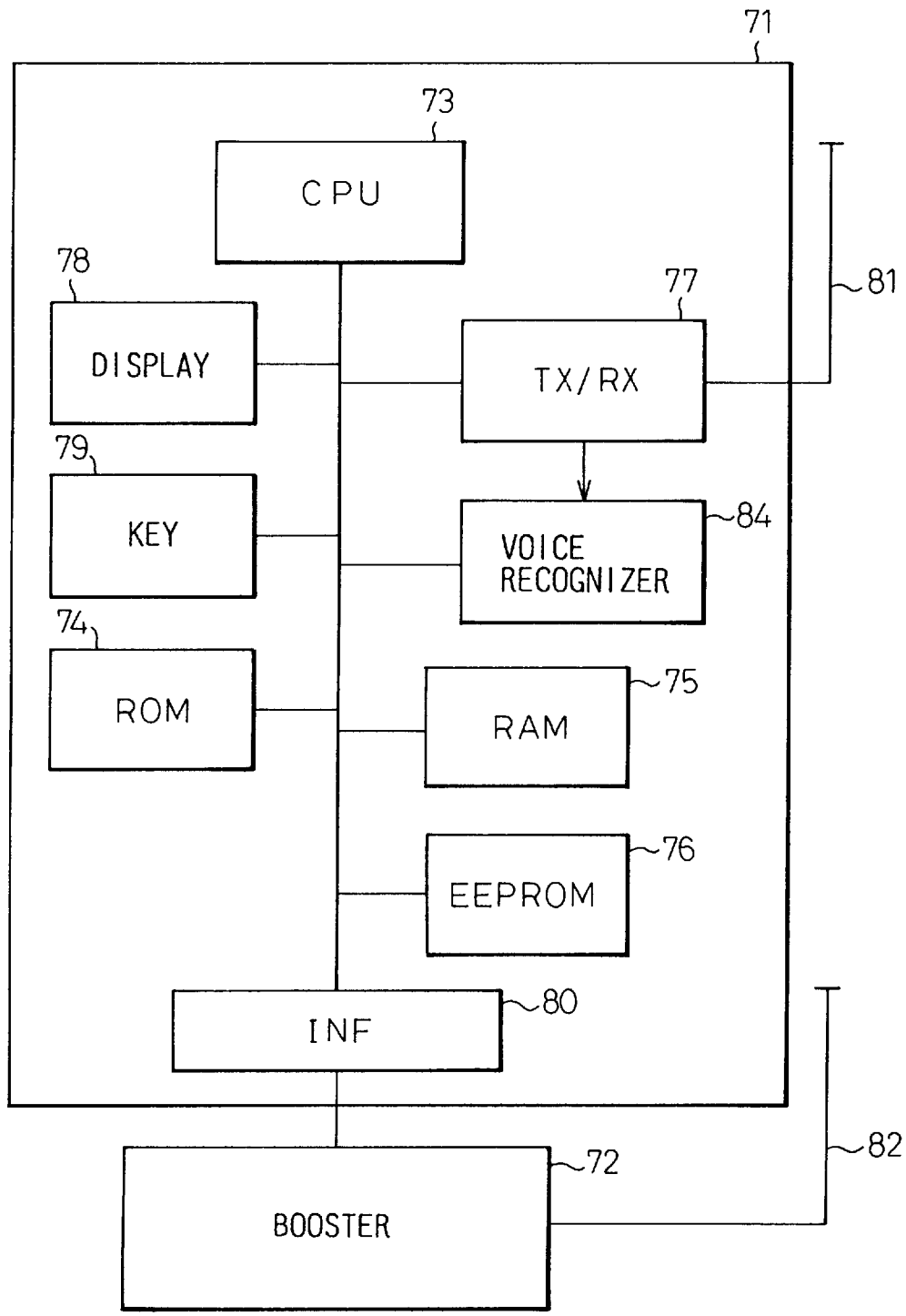
FIG. 5 is a diagram illustrating a fourth embodiment of the present invention.

FIG. 5 is a diagram illustrating a fourth embodiment of the present invention, wherein the same reference numerals as those in FIG. 4 designate the same parts. Reference numeral 84 indicates a voice recognizer which functions as a telephone number receiver/recognizer. This embodiment concerns a case where the remote party is requested to transmit his telephone number by voice. Since telephone numbers consist only of digits, the voice recognizer 84 can be implemented with relatively simple circuitry.

The recognized remote-party telephone number is stored in the random access memory 75, and when the portable telephone 71 is connected to or disconnected from the booster 72 during the call, the call is terminated, and then an automatic redialing operation is performed with the stored telephone number. The communication can thus be resumed with the station class mark of the portable telephone 71 when the booster 72 is disconnected and with the station class mark of the booster 72 when the booster 72 is connected.

Figure 6:
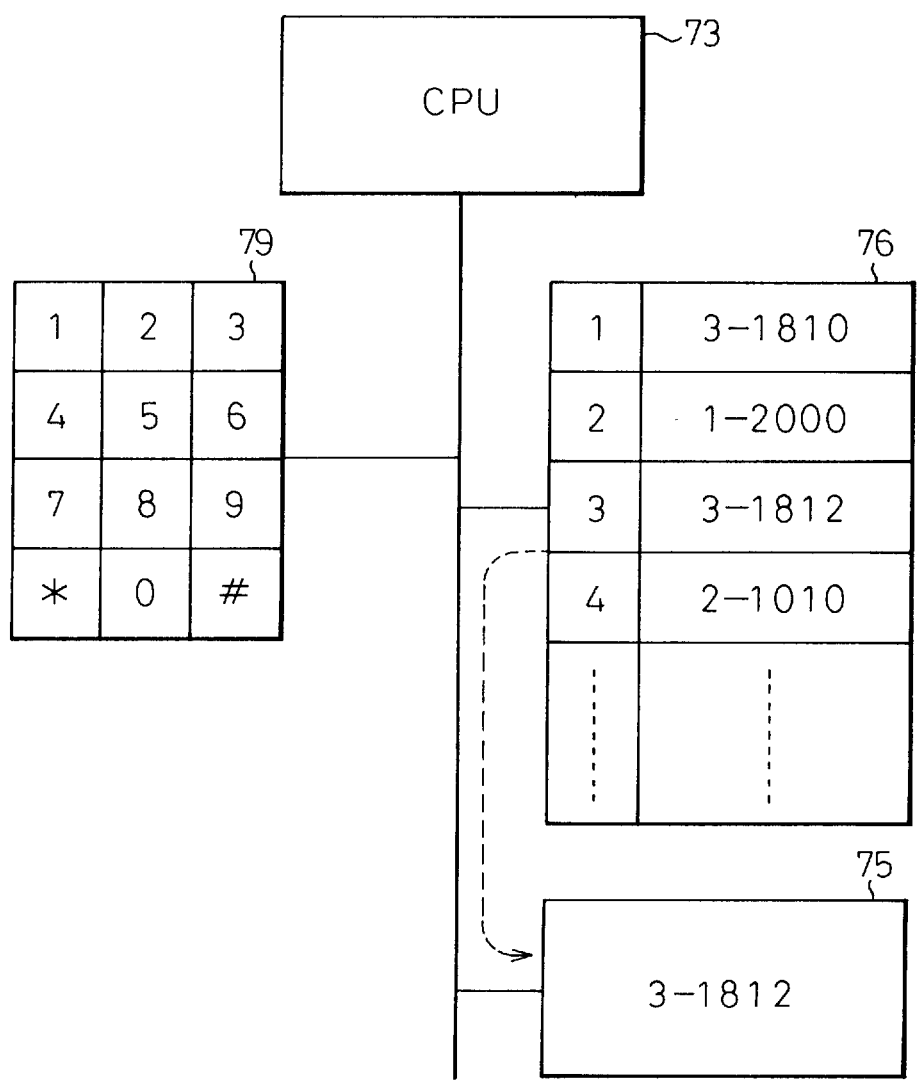
FIG. 6 is a diagram illustrating a fifth embodiment of the present invention.

FIG. 6 is a diagram illustrating a fifth embodiment of the present invention, showing a processor (CPU) 73, a random-access memory 75, a read-only memory 76, and a keypad 79. A plurality of remote telephone numbers are prestored in the read-only memory 76. By entering from the keypad 79 a number corresponding to the storage location holding the desired telephone number, the telephone number of the desired remote party can be retrieved for dialing.

In the above configuration, if it is desired to connect or disconnect the portable telephone 71 to or from the booster 72 during a call, a number, for example, "3", where the remote party's telephone number is stored, is entered from the keypad 79 along with a key, for example, "#", indicating a station class mark change request, whereupon under the control of the processor 73, the remote party's telephone number, for example, "3-1812", corresponding to the key "3", is read from a telephone number memory area in the read-only memory 76 and stored into the random-access memory 75 as the remote-party telephone number to be redialed.

When the portable telephone 71 is connected to or disconnected from the booster 72 during the call, under the control of the processor 73, the call is terminated, and then, a redialing operation is automatically performed with the remote telephone number stored in the random-access memory 75. At this time, the station class mark of the portable telephone 71 or the booster 72, depending on whether the booster 72 is connected or disconnected, is transmitted to the base station, after which communication control is performed, based on the station class mark of the portable telephone 71 or the booster 72 whichever is applicable.

As a means for storing a remote-party telephone number as described above, if calling-party telephone number service is used, for example, the telephone number of the remote party can be received and stored in the random-access memory 75 when an incoming call is answered. If such provision is made, the operation for storing remote-party telephone numbers can be eliminated.

Figure 7:
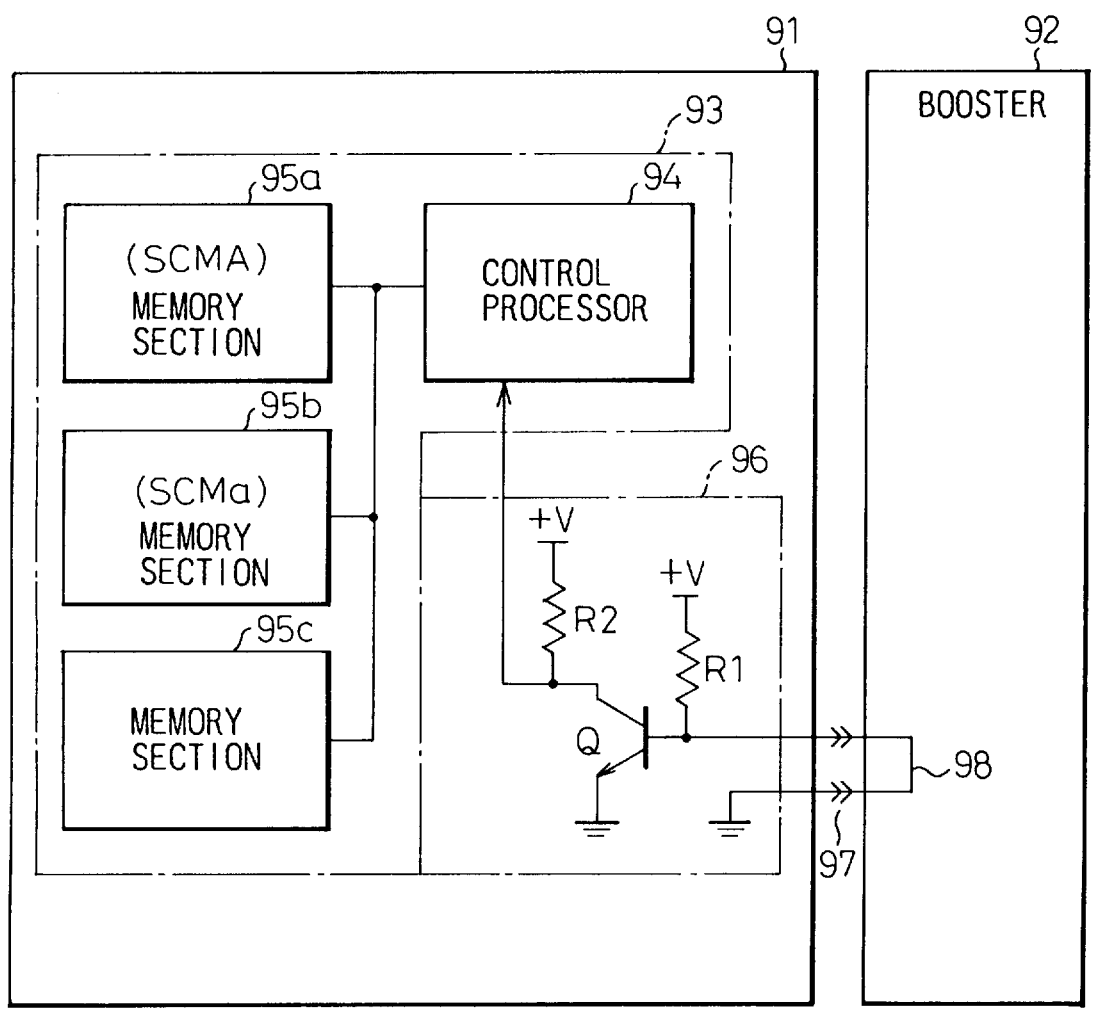
FIG. 7 is a diagram illustrating a sixth embodiment of the present invention.

FIG. 7 is a diagram illustrating a sixth embodiment of the present invention, wherein reference numeral 91 is a portable telephone, 92 is a booster, 93 is a controller, 94 is a control processor, 95a is a memory section for storing the station class mark SCMA of the booster, 95b is a memory section for storing the station class mark SCMa of the portable telephone, 95c is a memory section for storing the operating condition indicating whether the portable telephone is in communication mode or not, 96 is a connection detector, 97 is a connector, 98 is a shorting circuit, provided in the booster, for shorting the connector pins, Q is a transistor, R1 and R2 are resistors, and +V indicates a supply voltage. The voice communication parts, such as the microphone and speaker, and the radio transmit/receive section in the portable telephone 91, as well as the radio transmit/receive section, controller, etc. in the booster 92, are not shown here.

The station class mark SCMA of the booster 92 is stored in the memory section 95a beforehand or by operating the keypad, etc. before making a call, as previously described. The memory section 95b is used to retain the station class mark SCMa of the portable telephone 91. The memory 95a section is constructed, for example, from a random-access memory, and the memory section 95b is implemented using, for example, a read-only memory or a random-access memory.

The memory section 95c is used to store the operating condition detected by the control processor 94 that forms part of the communication detector. The memory section 95c is implemented using, for example, a random-access memory. In the connection detector 96, when the portable telephone 91 is connected to the booster 92 via the connector 97, the base of the transistor Q is grounded through the shorting circuit 98 in the booster 92, as a result of which a connection detected signal "1" is applied to the control processor 94. On the other hand, when the portable telephone 91 is disconnected from the booster 92, the supply voltage +V is applied to the base of the transistor Q via the resistor R2, causing the transistor Q to turn on, as a result of which a disconnection detected signal "0" is applied to the control processor 94.

When the portable telephone 91 is connected to the booster 92, the control processor 94 performs control so that the station class mark SCMA of the booster 92 is read from the memory section 95a and transmitted to the base station via the booster 92 at the beginning of a call. On the other hand, when a call is commenced using the portable telephone 91 as an independent unit, control is performed so that the station class mark SCMa of the portable telephone 91 is read from the memory section 95b and transmitted to the base station via the transmit/receive section (not shown) in the portable telephone 91 at the beginning of the call.

When a call is commenced using the portable telephone 91 as an independent unit, if the portable telephone 91 is connected to the booster 92 during the call, the connection detected signal "1" is applied from the connection detector 96 to the control processor 94, and since the operating condition is stored in the memory section 95c, the booster 92 is instructed to operate with the transmitter output of the portable telephone 91. Therefore, when a call is commenced using the portable telephone 91 as an independent unit and the booster 92 is connected during the call, the base station continues to control the transmitter output by judging that the call is being carried on using the portable telephone 91. In this condition, since the portable telephone 91 can operate from the power supply of the booster 92, the continuous call time of the portable telephone 91 can be extended.

Figure 8:
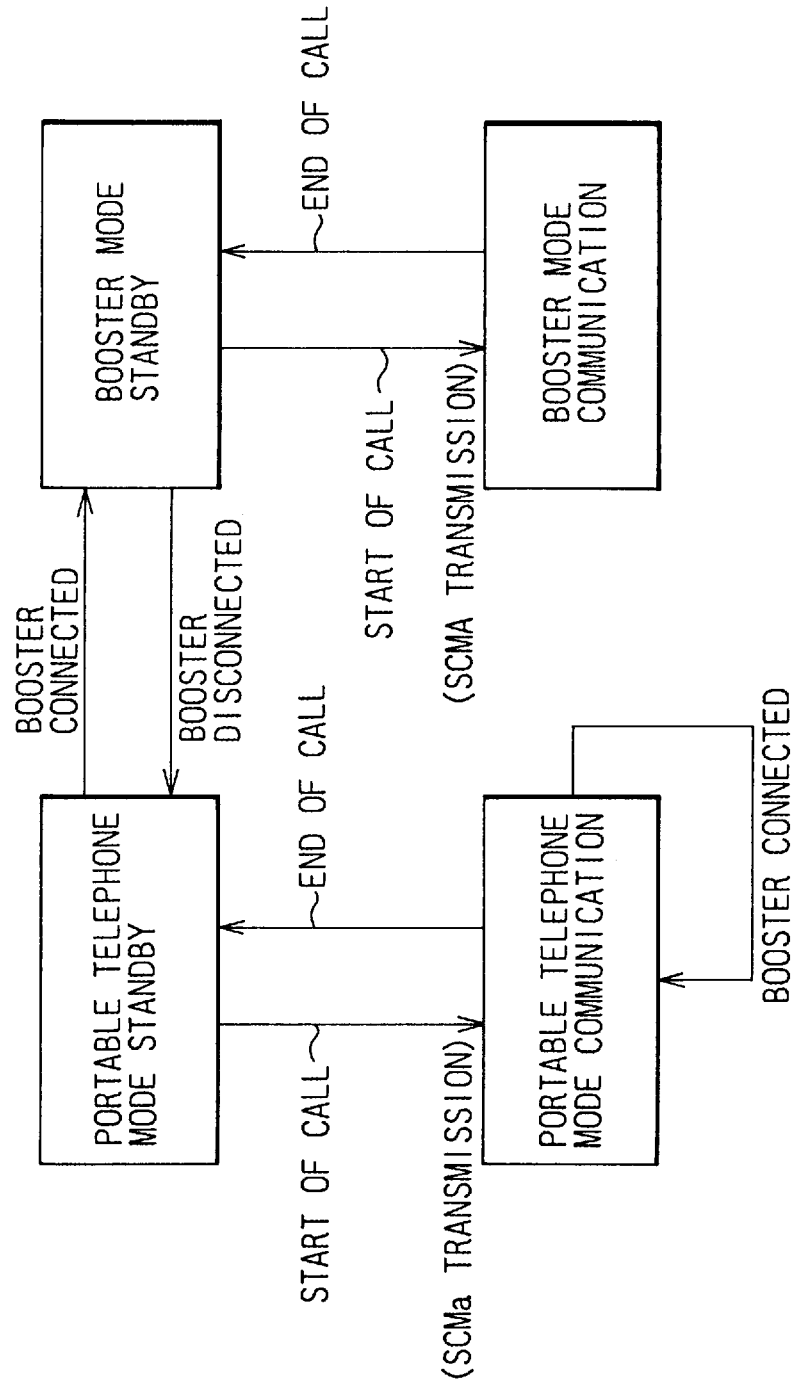
FIG. 8 is a diagram for explaining state transitions in the sixth embodiment of the present invention.

FIG. 8 is a diagram for explaining state transitions in the sixth embodiment of the present invention. With the booster 92 disconnected, the portable telephone 91 as an independent unit is placed on standby; upon initiation of a call or reception of an incoming call, the station class mark SCMa is transmitted to commence communication in portable telephone mode, and upon termination of the call, the state returns to portable telephone mode standby. If the booster 92 is connected during the communication in the portable telephone mode, as described above, the ongoing call continues in the portable telephone mode despite the booster connected (CON) state. In this case also, the state returns to the portable telephone mode standby upon termination of the call.

On the other hand, when the portable telephone 91 is placed on booster mode standby with the booster 92 connected to it, the station class mark SCMA is transmitted upon initiation of a call or reception of an incoming call, and the communication starts in the booster mode. Upon termination of the call, the state returns to the booster mode standby.

Figure 9:
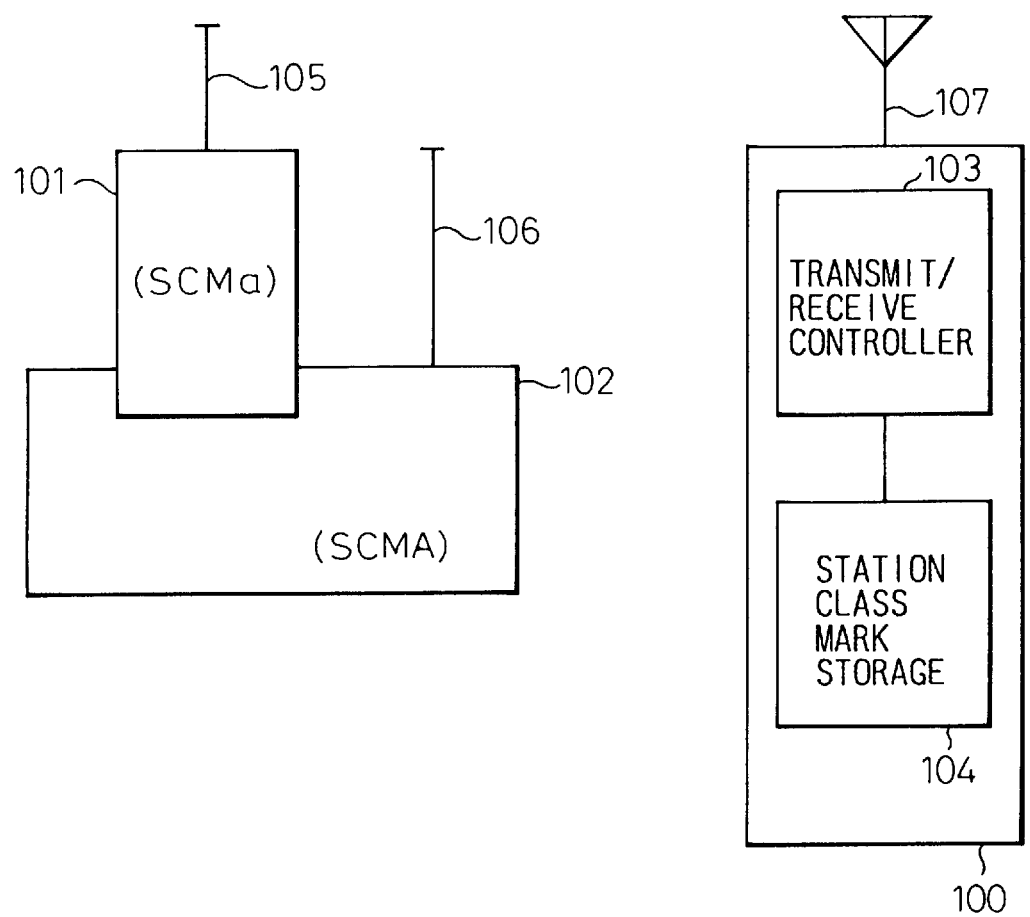
FIG. 9 is a diagram illustrating a seventh embodiment of the present invention.

FIG. 9 is a diagram illustrating a seventh embodiment of the present invention. This embodiment is concerned with a mobile communication system comprising a base station 100, a portable telephone 101, and a booster 102, wherein provisions are made in the base station 100 for accepting a station class mark change request during a communication. Reference numeral 103 designates a transmit/receive controller, 104 a station class mark storage, and 105 to 107 are antennas. The base station 100 is equipped with means for transmitting mobile terminal transmitter output control information to the transmit/receive controller 103 based on the station class mark. Means, such as a processor, for judging the acceptance or rejection of a station class mark change request is provided in the base station 100. On the other hand, the mobile terminal is equipped with means for detecting the connection or disconnection of the portable terminal 100 with respect to the booster 102 and for transmitting a station class mark change request to the base station 100.

When a call is initiated from the mobile terminal with the portable telephone 101 connected to the booster 102, the station class mark SCMA of the booster 102 is transmitted from the booster 102 to base station 100. The base station 100 then stores the station class mark SCMA in the station class mark storage 104, transmits an acknowledgement from the transmit/receive controller 103 to the mobile terminal, and controls the transmitter output in booster mode.

When the portable telephone 101 is disconnected from the booster 102 during the call, the disconnection of the booster 102 is detected, for example, by the connection detector 96 in FIG. 7, and the station class mark SCMa of the portable telephone 101 is transmitted along with a station class mark change request. In the base station 100, the acceptance or rejection of the change request is judged by the transmit/receive controller 103 or by judging means (not shown) constructed from a processor or the like. When the request is accepted, the station class mark stored in the station class mark storage 104 is changed from SCMA to SCMa, and at the same time, an acknowledgement is transmitted to the portable telephone 101. The base station 100 now controls the transmitter output of the portable telephone 101 in the portable telephone mode, allowing the ongoing call to continue without interruption.

We claim:

1. A mobile terminal comprising:
   means for transmitting first data indicating a station class of a booster-disconnected condition to a base station when a voice communication is commenced with a booster disconnected;
   means for transmitting second data indicating a station class of a booster-connected condition to a base station when a voice communication is commenced with a booster connected; and
   means for changing data that said second data transmitting means transmits with a booster connected with a booster connected from said second data to said first data in accordance with a user request.

2. A mobile terminal according to claim 1, wherein said second data transmitting means transmits said second data stored in a memory to the base station, and said data changing means changes the contents of said memory from said second data to said first data.

3. A mobile terminal comprising:
   means for transmitting first data indicating a station class of a booster-disconnected condition to a base station when a voice communication is commenced with a booster disconnected;
   means for transmitting second data indicating a station class of a booster-connected condition to a base station when a voice communication is commenced with a booster connected;
   means for detecting whether a booster is connected or not; and
   when said booster connection detecting means has detected the connection of a booster during the communication, means for transmitting said first data to said base station, and for instructing said booster to transmit said first data and to operate with a transmitter output applicable to the booster-disconnected condition.

4. A mobile communication system comprising a mobile station and a base station, said mobile station comprising
- means for transmitting first data indicating a station class of a booster-disconnected condition to the base station when a voice communication is commenced with the booster disconnected,
- means for transmitting second data indicating a station class of a booster-connected condition to the base station when a voice communication is commenced with the booster connected,
- means for detecting whether the booster is connected or not, and means for transmitting one of said first data and said second data to the base station along with a station class change request when said booster connection detecting means has detected one of disconnection and connection, respectively of the booster during the communication, and said base station comprising
- means for changing data of the station class of the mobile station in response to said station class change request during the voice communication. said base station controlling output level of said mobile station based on said changed data.

\* \* \* \* \*